(12) United States Patent
Ohlsson et al.

(10) Patent No.: US 6,914,398 B2
(45) Date of Patent: Jul. 5, 2005

(54) ROTARY MACHINE CONTROL

(75) Inventors: Bertil Ohlsson, Västerås (SE); Said Zahrai, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/432,051

(22) PCT Filed: Oct. 3, 2001

(86) PCT No.: PCT/SE01/02137

§ 371 (c)(1),
(2), (4) Date: May 19, 2003

(87) PCT Pub. No.: WO02/41485

PCT Pub. Date: May 23, 2002

(65) Prior Publication Data

US 2004/0012351 A1 Jan. 22, 2004

(30) Foreign Application Priority Data

Nov. 20, 2000 (SE) .............................. 0004249

(51) Int. Cl.⁷ .............................. H02P 5/00
(52) U.S. Cl. ................ 318/268; 318/723; 318/729; 318/805; 318/807
(58) Field of Search ............... 318/798, 452, 318/806, 729, 809, 805, 801, 727, 779, 807; 363/37, 79

(56) References Cited

U.S. PATENT DOCUMENTS

| | | | | |
|---|---|---|---|---|
| 4,158,163 A | * | 6/1979 | Eriksen et al. | 318/798 |
| 4,384,243 A | * | 5/1983 | Muskovac | 318/729 |
| 4,400,655 A | * | 8/1983 | Curtiss et al. | 318/729 |
| 4,469,997 A | * | 9/1984 | Curtiss et al. | 318/729 |
| 4,565,957 A | * | 1/1986 | Gary et al. | 318/723 |
| 4,727,305 A | * | 2/1988 | Muskovac et al. | 318/798 |
| 5,008,608 A | | 4/1991 | Unsworth et al. | |
| 5,160,878 A | * | 11/1992 | Nagano | 318/800 |
| 5,212,438 A | * | 5/1993 | Miyazaki et al. | 318/805 |
| 5,334,923 A | * | 8/1994 | Lorenz et al. | 318/805 |
| 5,387,855 A | * | 2/1995 | Miyazaki et al. | 318/805 |
| 5,448,150 A | * | 9/1995 | Yamamoto et al. | 318/805 |
| 5,481,173 A | | 1/1996 | Yamamoto | |
| 5,532,570 A | * | 7/1996 | Tajima et al. | 318/809 |
| 5,565,752 A | * | 10/1996 | Jansen et al. | 318/807 |
| 5,585,709 A | * | 12/1996 | Jansen et al. | 318/807 |
| 5,828,199 A | * | 10/1998 | Tajima et al. | 318/779 |
| 5,841,264 A | * | 11/1998 | Caen | 318/727 |
| 5,965,995 A | * | 10/1999 | Seibel et al. | 318/805 |
| 6,229,278 B1 | * | 5/2001 | Garces et al. | 318/801 |

FOREIGN PATENT DOCUMENTS

EP      0621680      4/1994

* cited by examiner

*Primary Examiner*—Paul Ip
(74) *Attorney, Agent, or Firm*—Venable LLP; Eric J. Franklin

(57) ABSTRACT

The present invention discloses devices and methods for improved starting and stopping of rotary motors. A rotary electrical machine (3) is supplied with a voltage from a voltage supply (10). The magnitude of a phase current is measured. The measured current value (IM) and applied voltage (U) is compared with what is expected for a predetermined target slip (ST), by means of a relation between phase current, applied voltage and slip. The comparison gives a discrepancy value, which is used to create a regulation signal (ΔU) to the voltage supply (10). To start and stop the machine, the target slip is increased and decreased, respectively, in a predetermined manner. The means for regulation may be provided as a separate add-on unit to existing soft starter equipment.

33 Claims, 7 Drawing Sheets

US 6,914,398 B2

ROTARY MACHINE CONTROL

TECHNICAL FIELD

The present invention relates generally to devices and methods for speed regulation of rotary electrical machines. The invention is particularly relevant for soft starters/stoppers for asynchronous rotary electrical machines.

BACKGROUND

Asynchronous machines are today used in a wide variety of applications. Asynchronous machines have a large number of advantages. It has generally a simple construction and is typically very safe in operation, which implies a long life. However, the starting and stopping of asynchronous machines requires additional considerations. Applying full voltage at once will result in very large current peaks, which results in a voltage drop. For large motors, in particular in combination with weak power networks, such voltage drops may cause large disturbances in the network. A slow start of the machine is therefore often requested, at least for larger motors. In large and complicated applications, the asynchronous machines are sometimes equipped with speed regulators, sensing the actual slip and talking measures to obtain the required operational conditions. However, for simple applications, solutions based on actual slip sensing are generally too expensive. A common way to solve the starting and stopping problems is to add a device—a soft starter/stopper—which ramps the voltage supplied to the asynchronous motor up and down according to predetermined time schedules.

FIG. 1a illustrates typical torque curves as a function of the rotational speed for an asynchronous motor used for driving a pump. The broken line corresponds to the motor and the full line corresponds to the load. At normal operation, the operational point is situated at the intersection of the curves, i.e. at the point A. Upon stopping the motor, the most common prior art soft starter/stopper makes use of a linear ramp-down of the voltage. The torque available from the motor will during such a procedure be scaled down in the same rate. FIG. 1b illustrates a situation, where the motor voltage has been reduced to give a new operational point B. This operational point B is, however, unstable, and a small disturbance may lead to a small decrease in torque, which in turn leads to a sudden change of the operational point to point C instead, where the torque of the machine is significantly reduced.

In systems where the load of the motor has a high momentum of inertia, this does not result in any problems. The rotational speed of the motor anyway will decrease slowly, because of the inertia of the load, until the motor stops. However, in many applications, such as for centrifugal pumps, the inertia of the load is low, and a sudden change of operational point of the motor will lead to a drastical change in motor speed. In the example in FIGS. 1a and 1b, the rotational speed will decrease rapidly by about 50%. This results in typically in large transients in the system to which the pump is connected. In a system where e.g. fluids of a relative high density are transported, a significant pressure wave can be created, which may damage the pump equipment as well as other parts of the system. This can include damaging vibrations or hammering.

Another problem area is the application of asynchronous motors to stirrers. Many fluids have a speed dependent viscosity. This means that a stationary fluid may have a considerably higher viscosity than the same fluid in motion. At the point when the fluid starts to move, the viscosity is significantly reduced. The load curve of a stirrer in such a system may e.g. look like the curve in FIG. 2. The curve shows a rather high initial load at zero speed, indicated by the filled circle, but the load decreases abruptly when the speed exceeds zero, as indicated by the dotted line. Upon starting a pump in such a system with prior art soft starters, the voltage is ramped-up until the torque of the stationary load is reached. The motor will not move until this point is reached. When the motion eventually starts, the load torque is significantly reduced, and the motor speed is suddenly increased. Such sudden change of rotational speed may damage the system due to vibration and/or mechanical damage.

In the U.S. Pat. No. 5,008,608 of Unsworth et. al. a controller for starting and stopping electric motors is disclosed. The controller comprises thyristor control means on each phase. The controller measures the interval between the voltage and the current when one phase of the motor makes a zero crossing. Based on this value and a reference value, the trigger times of the thyristors are controlled. To start and stop the motor, the reference value is gradually increased or decreased. The device prohibits sudden changes in torque upon stopping the motor. This solution is based on zero-crossing detection of both voltage and current. Such devices are, however, too expensive to be included in simple applications.

In the patent EP 0 621 680 B1, method for limiting the torque in soft starting of a three-phase asynchronous motor is disclosed. The regulation is made by thyristor control based on measurements of the active power of the machine. The torque is controlled, by regulating on the active power. To measure the active power, the current, voltage as well as the relative phase angle have to be measured. Also this solution is based on expensive components, unsuitable for many applications. Furthermore, this disclosure does not mention any problems in stopping the machine.

SUMMARY

The general object of the present invention is to provide less expensive devices and methods for soft start and stop of rotary electrical machines controlling the rotational speed. A further object of the present invention is to provide such devices and methods easily adaptable to co-operate with existent soft starters.

The above objects are achieved by devices and methods according to the enclosed claims. In general words, a current measurement is used as input in a feedback regulation of a supplied voltage to a rotary electrical machine. More in detail, a rotary electrical machine is supplied with a voltage from a voltage supply. A phase current is measured. The measured current value is compared with what is expected for a predetermined target slip at the particular applied voltage, by means of a relation between phase current, voltage and slip. In one embodiment, the measured current is converted to a "measured" or actual slip according to the relation, which actual slip is compared to the target slip, giving a discrepancy value. In another embodiment, the target slip is converted to a target current according to the relation, which target current is compared to the measured current, giving a discrepancy value. The two alternative embodiments may also be combined. The discrepancy value is used to create a correctional voltage from the voltage supply. To start and stop the machine, the target slip is increased or decreased, respectively.

In another aspect of the invention, the obtained discrepancy value according to the above description is used for monitoring the continuous operation of the rotary electrical machine.

BRIEF DESCRIPTION OF THE DRAWINGS

The invention, together with further objects and advantages thereof, may best be understood by making reference to the following description taken together with the accompanying drawings, in which:

FIG. 1b is a diagram illustrating torque curves for operation at reduced voltage of the asynchronous motor and pump load of FIG. 1a;

DETAILED DESCRIPTION

In the following, a number of quantities and signals representing quantities are discussed. In a general case, there is no distinction made between the quantities and the signal representing it, since a conversion there between can easily be performed by anyone skilled in the art. Consequently, both the actual value of the quantity and the signal representing it, will be referenced by the same notations.

Through-out the present document, all relations concerning speed and related quantities are mainly discussed in terms of slip. However, as anyone skilled in the art understands, the same relations are also valid for quantities directly derivable from the slip, such as e.g. the rotational speed of an asynchronous motor. Since the power network frequency is known, there is a unique relation between slip and rotational speed, and all relations involving slip can instead be altered to concern rotational speed instead. Such modifications are understood to be covered by the present invention.

Figure 3:
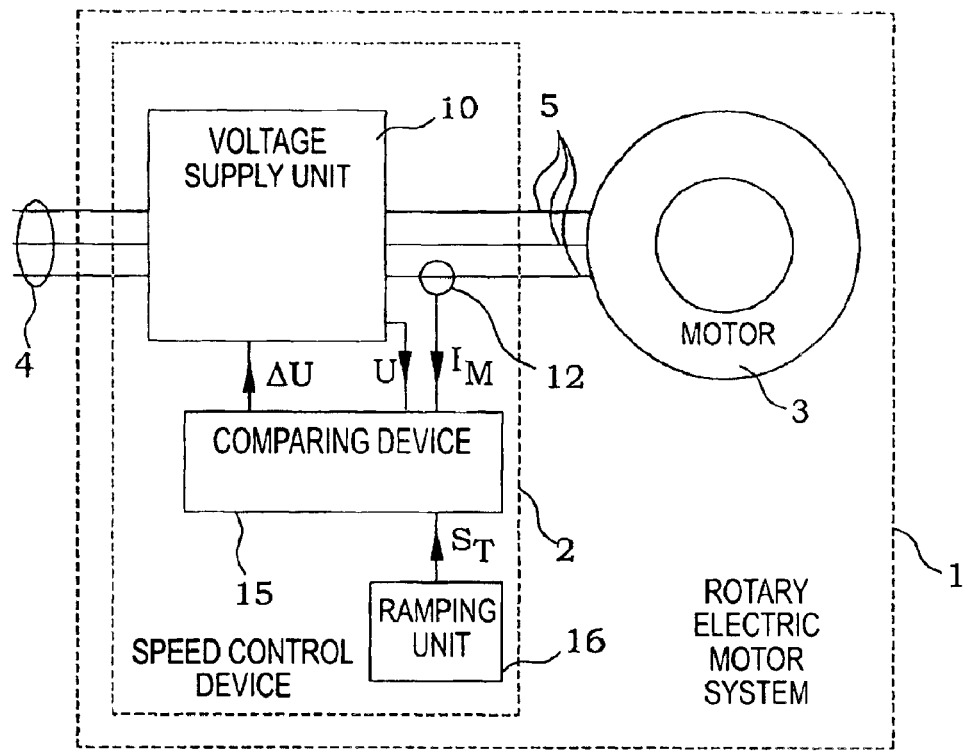
FIG. 3 is a block diagram of an embodiment of a rotary electrical motor system according to the present invention.

FIG. 3 illustrates a rotary electrical motor system 1 comprising a speed control device 2 and a rotary electrical motor 3. The speed control device 2 is in this embodiment connected to a power network (not shown) by a three-phase connection 4. The speed control device 2 regulates the voltage of the power network and supplies the rotary electrical motor 3 with appropriate phase voltages, by motor phase connections 5.

The rotary electrical motor 3 is in a typical case a squirrel cage asynchronous motor working with three phases. The motor 3 may as anyone skilled in the art understands also be of other types, for instance reluctance machines.

The speed control device 2 comprises in this embodiment a voltage supply unit 10 connected between the three-phase connection 4 and the rotor phase connections 5. The voltage supply unit 10 is arranged to be able to regulate the input voltage in order to provide suitable rotor phase voltages. The voltage U supplied to the motor is thus known. A current meter 12 is arranged to measure the current that is fed into the motor through one of the motor phase connections 5. This current value is typically a RMS value, corresponding to the mean current flowing into the motor, but may also be a measure of other current parameters. Alternatively the current may be measured for more than one phase, for example for each of three phases. A signal $I_M$, representing this measured current value, and a signal U, representing the applied voltage, are sent to a comparing device 15. The comparing device 15 compares the measured current value with what is expected from a target slip value $S_T$. The result is a regulation signal $\Delta U$, which represents a requested change of the input voltage U. In other words, $\Delta U$ is the feed-back signal to the voltage supply. The input signals to the comparing device 15 are the signals representing the applied voltage U, the measured phase current $I_M$ and the target slip value $S_T$. A signal representing this target slip value $S_T$ is in this embodiment provided by a ramping unit 16.

The comparing device 15 comprises means for obtaining a signal representing a discrepancy value, using a predetermined relation between current, voltage and slip. Discussions about how this is achieved will follow further below. The discrepancy value is brought further to a regulator 18, comprised in the comparing device 15. The output signal of the regulator 18 is the output signal of the comparing device, and as mentioned above it is constituted by a signal $\Delta U$ representing an additional voltage that is to be supplied to the rotary electrical motor. The signal $\Delta U$ is preferably a signal, which can cause the voltage supply unit 10 to increase its output voltage with the requested amount. Alternatively, the signal $\Delta U$ can be the additional voltage itself. The signal $\Delta U$ is obtained based on the discrepancy value, for instance by a suitable filter or regulation circuit.

By letting the target slip $S_T$ vary with time, a smooth ramping-up or ramping-down is achieved. Since the regulation is performed against a target slip rather than to any electrical quantities, the performance of the motor will be smooth, without any large deviations from the target slip resulting in sudden uncontrolled changes in torque, speed or excessive currents etc. The actual measurement is performed on an electrical quantity, but since the relation between motor current and slip is a monotonic function having a known general shape, a reliable conversion is available. As anyone skilled in the art understands, such relation has to be determined for the motor or motor type in question. This will be discussed further below.

Figure 4A:
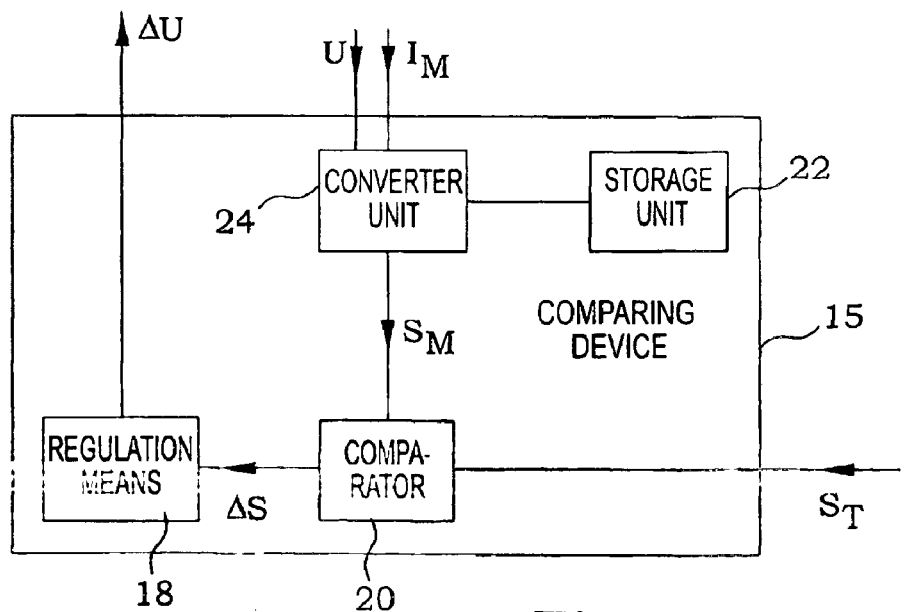
FIG. 4a is a block diagram of an embodiment of a comparator usable with the present invention.

In FIG. 4a, an embodiment of a comparing device 15 is illustrated. The comparing device 15 receives a signal representing a measured current value $I_M$ from a current meter 12 (FIG. 3), a signal representing the applied voltage U and a signal representing a target slip $S_T$ from a ramping unit 16

(FIG. 3). In this embodiment, the measured current value is input into a converter unit 24, which converts the measured current value to a corresponding slip value. If the relation is reliable, this value is the actual slip value $S_M$, and constitutes the output from the converter unit 24. The means for obtaining the actual slip value $S_M$ is the relation between slip, voltage and phase current. This relation is stored in a storage unit 22. The form of storage as well as the actual form of the relation can vary considerably, which is discussed further below. However, the storage unit 22 supplies the converter unit 24 with adequate information in order to perform the conversion.

The actual slip value $S_M$ and the target slip value $S_T$ are compared in a comparator 20. The output from the comparator 20 is the discrepancy value $\Delta S$ and in this embodiment $\Delta S$ is set to the difference between $S_M$ and $S_T$. The discrepancy value $\Delta S$ is brought further to the regulation unit 18.

Figure 4B:
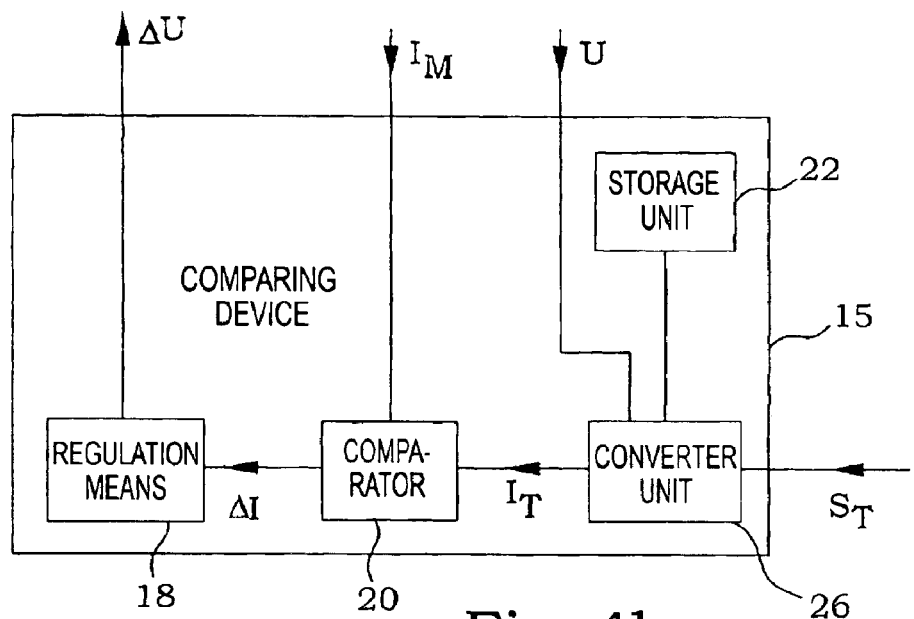
FIG. 4b is a block diagram of another embodiment of a comparator usable with the present invention.

In FIG. 4b, another embodiment of a comparing device 15 is illustrated. Also this embodiment of the comparing device 15 receives a signal representing a measured current value $I_M$ from a current meter 12 (FIG. 3), a signal representing the applied voltage U and a signal representing a target slip $S_T$ from a ramping unit 16 (FIG. 3). In this embodiment, however, the target slip $S_T$ is input in a converter unit 26, which converts the target slip $S_T$ to a corresponding target current value $I_T$. This value constitutes the output from the converter unit 26. The means for obtaining the target current value $I_T$ is the relation between slip, voltage and phase current. This relation is, as described above, stored in the storage unit 22. The storage unit 22 supplies the converter unit 26 with adequate information in order to perform the conversion.

The measured current value $I_M$ and the target current value $I_T$ are compared in a comparator 20. The output from the comparator 20 is the discrepancy value $\Delta I$ and in this embodiment $\Delta I$ is set to the difference between $I_M$ and $I_T$. The discrepancy value is brought further to the regulation unit 18.

Figure 4C:
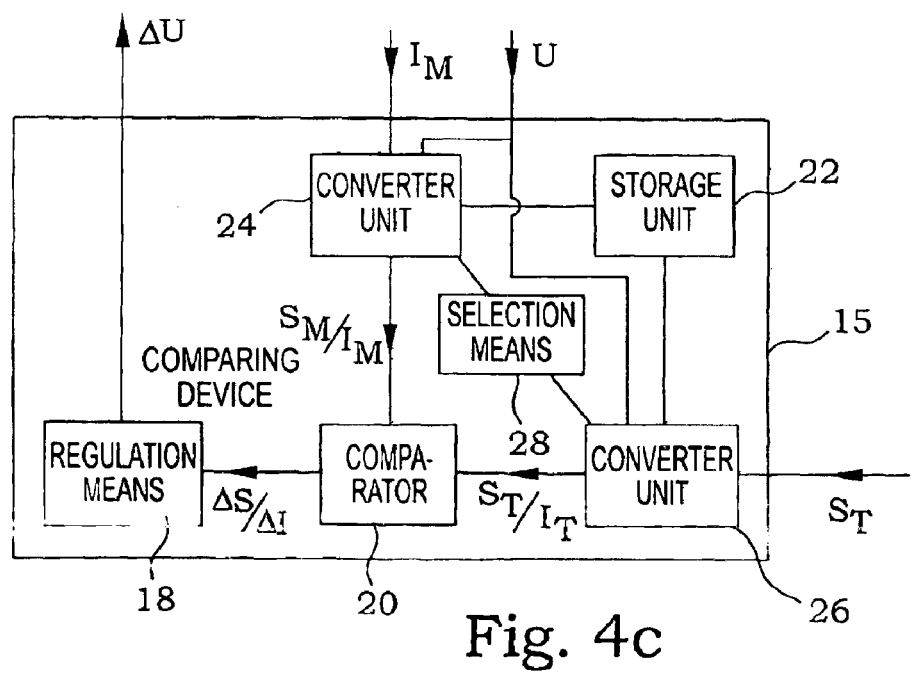
FIG. 4c is a block diagram of yet another embodiment of a comparator usable with the present invention.

In fig. 4c, a third embodiment of a comparing device 14 is illustrated. This embodiment is basically a combination of the embodiments in FIGS. 4a and 4b. Also this embodiment of the comparing device 14 receives a signal representing a measured current value IM from a current meter 12 (FIG. 3), a signal representing the applied voltage U and a signal representing a target slip ST from a ramping unit 1 (FIG. 3). In this embodiment, two converter units 24, 26 are present, having the corresponding functions of the converter units of the two first embodiments, respectively. Furthermore, a selector 28 is connected to the converter to the units 24, 26, in order to activate one of the units at a time. Each converter unit 24, 26 can then be made operable in e.g. a certain slip range, where this particular regulation is best suited. When not in operation, the converter units 24, 26 leave the signals to the comparator unit 20 unaltered. The relation storage is then used for both the converter units, but in an opposite manner.

The measured current value $I_M$ and the target current value $I_T$ are compared in the comparator unit 20 when the conversion unit 26 is in operation. The actual slip value $S_M$ and the target slip value $S_T$ are compared in the comparator unit 20 when the conversion unit 24 is in operation. The output from the comparator unit 20 is the discrepancy value and in this embodiment is set to the difference either between $I_M$ and $I_T$ or between $S_M$ and $S_T$. The discrepancy value $\Delta S/\Delta I$ is brought further to the regulation unit 18.

The signal representing a requested voltage change $\Delta U$ is obtained from the discrepancy value $\Delta S/\Delta I$. This voltage regulation is preferably performed as a conventional voltage regulation. If the voltage supply 10 comprises thyristor control circuits, similar to what is shown in e.g. U.S. Pat. No. 5,008,608, $\Delta U$ controls preferably the timing of such circuits. The voltage change signal $\Delta U$ then consists of a firing time delay, corresponding to a desired voltage change $\Delta U$, which is fed to the thyristor control circuits.

Figure 9:
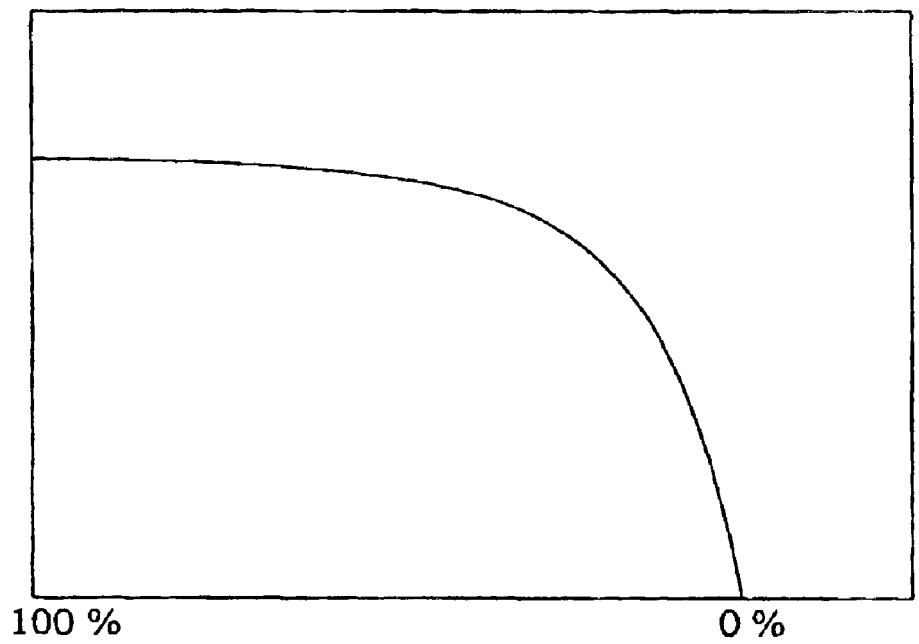
FIG. 9 is a diagram illustrating a typical relation between current and slip for a constant supply voltage to an asynchronous motor.

For a constant supply voltage to an asynchronous motor, a typical relation between current, and slip is illustrated in FIG. 9. The relation is monotonic, which means that there is a one-to-one relation between each value of slip and current for a specified voltage. One such relation exists for every value of supplied voltage. The relation can be used for conversion in either direction. If a current is measured, a corresponding value of the slip is obtained. Similarly, if a target slip is selected, this value can easily be converted into a corresponding target current value. Each value of the supply voltage has its own current-to-speed relation, which basically is similar to the illustrated curve. A signal representing the actual voltage supplied to the motor is therefore necessary to obtain the adequate relation. The relation is preferably stored as a look-up table in a memory storage means, connected for example to the comparator device 15, such as a Read Only Memory (ROM), PROM or EPROM. The memory storage means may optionally not be adjacent but be located in a distant computer or server. In the embodiment of FIG. 4a, the voltage signal U and the measured current signal $I_M$ are used as addressing inputs, and a corresponding actual slip value is obtained. In the embodiment of FIG. 4b, the voltage signal U and the target slip $S_T$ are used as addressing inputs, and a corresponding target current value is obtained. The relation can also be stored as a parameterised function, where voltage and current/speed are used as parameters.

The relation between motor current, motor voltage and slip can be obtained in different ways. One obvious possibility is to measure the relation either in connection with the manufacturing of the motor, or when installed. The relations are then obviously reliable, but the amount of efforts to obtain it is large. Another possibility is to measure just a few critical points at the curves and estimate the rest of the relation based on these few values. These values should preferably be standard data supplied by a motor manufacturer. The behaviour from one motor to another or from one type to another is believed to be rather similar, and the variations are smooth, which would lead to rather reliable relations.

Figure 8:
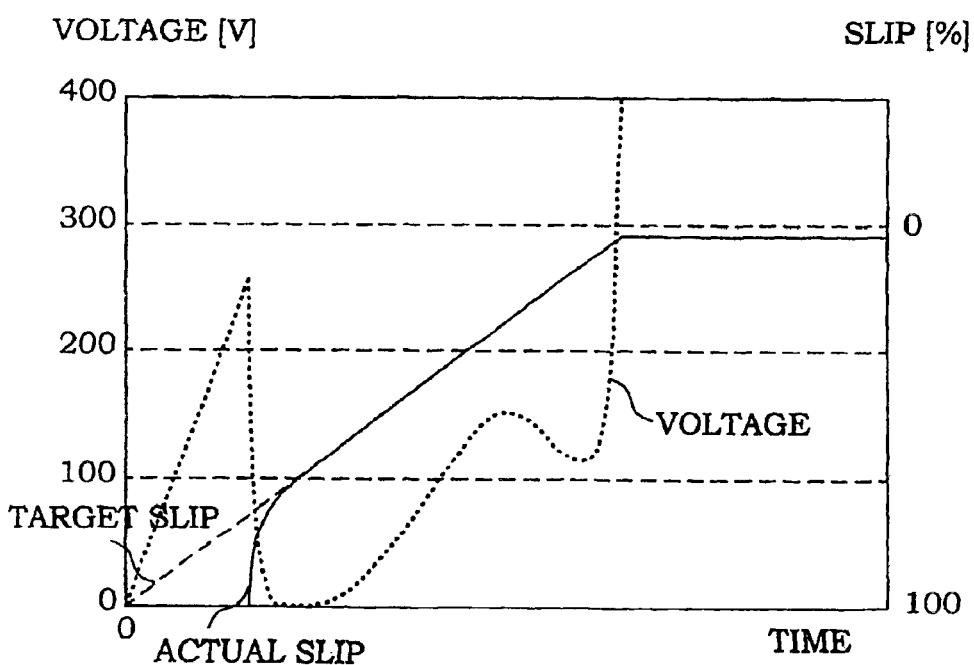
FIG. 8 is a diagram illustrating possible behaviour of voltage and rotational speed as a function of time during a starting procedure of a stirrer according to the present invention.
Figure 7:
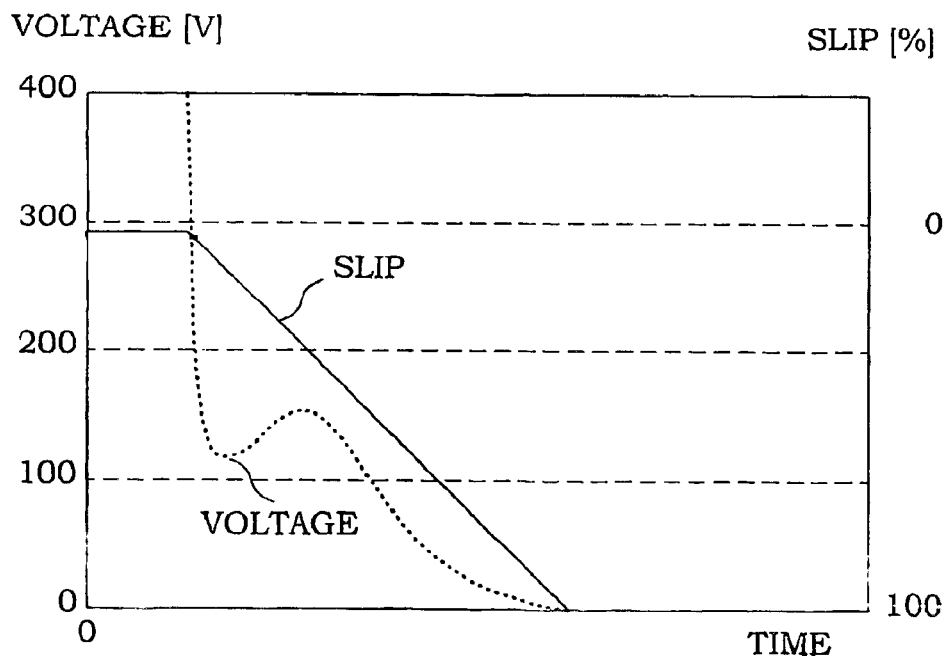
FIG. 7 is a diagram illustrating possible behaviour of voltage and rotational speed as a function of time during a stopping procedure of a pump motor according to the present invention.

A ramping unit 16 provides the target slip. The voltage regulation is designed to regulate towards this target slip. In order to achieve an increased or decreased slip, the target slip has to change with time. The target slip $S_T$ is thus varied according to a predetermined time schedule. In most start or stop applications, the ideal behaviour is typically to have a smoothly varying ramping-up or ramping-down of the slip. An example of a start sequence of target slip is illustrated in FIG. 8. The speed is originally zero and is then linearly ramped up to the requested slip for continuous operation. A typical example of a stop sequence of target slip is illustrated in FIG. 7. The speed is originally the one for continuous operation and is then ramped down in a linear, or other predetermined way, to zero. If the motor is forced to follow such speed variations, no sudden and damaging events will occur. The ramping unit 16 is therefore arranged to provide a smooth ramping of the target slip value. The ramping down may optionally include portions in which stepwise changes to the target slip are specified as required. The ramping may be linear, as in FIGS. 7 and 8, but may also be of any other type, which is lenient to the motor equipment, the pump or other load, and the power supplying network.

The present invention has properties which makes it very useful for starting and stopping a rotary electrical motor.

During the continuous operation of a rotary motor, there is, however, normally a wish for monitoring the operational state and being able to detect deviations from normal behaviours. The present invention provides also a solution for this. If the actual regulation of the motor is performed by other means, parts of the regulator of the present invention can be used for monitoring purposes instead. The current IM can be continuously measured, and the voltage supplied to the machine is typically the one of the power network. By keeping the target slip constant, a discrepancy value, either AI or AS, can easily be obtained. This value is a good measure of the deviation from the ideal operation, and is a good quantity to display e.g. for an operator for supervision purposes.

Figure 5:
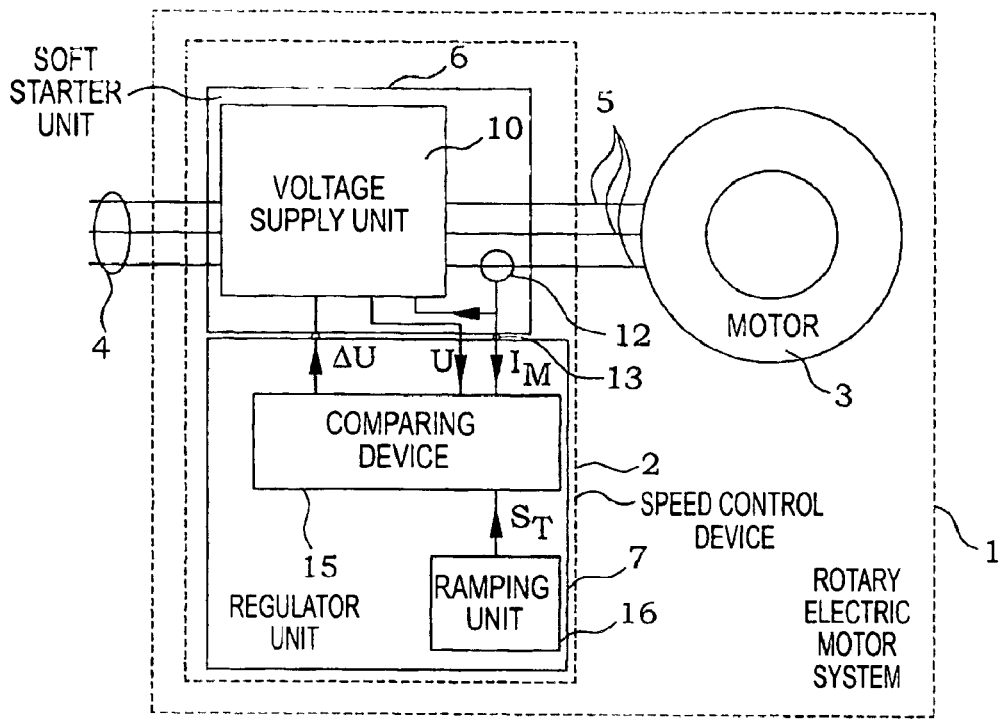
FIG. 5 is a block diagram of another embodiment of a rotary electrical motor system according to the present invention, based on a conventional soft starter unit.

In FIG. 5, another embodiment of the present invention is illustrated. This embodiment is based on a conventional soft starter unit 6 of an asynchronous motor 3. Such a soft starter unit 6 comprises a voltage supply unit 10 providing the actual voltage to the motor. The voltage supply unit 10 typically also involves overcurrent protection means (not shown separately), based on measurements of a current meter 12. The current meter 12 thus supplies the voltage supply unit 10 by a signal representing the phase current to the motor. This signal can easily be used as an input signal to a regulator unit 7 according to the present invention. The voltage supply unit 10 also provides a signal representing the output voltage.

Signals corresponding to the measured current and the applied voltage are thus provided as input signals to the regulator unit 7. The regulator unit 7 comprises a comparing device 15, including a regulator 18, and a ramping unit 16. These parts are essentially described above. The output of the regulateor 18 is a signal corresponding to a requested change in voltage, and this becomes also the output signal from the entire regulator unit 7. The regulator unit output signal is supplied to the soft starter unit 6.

This embodiment illustrates one advantage with the present invention. Conventional soft starters can according to this embodiment be supplied by a separate regulator unit 7, which carries out most of the operations according to the present invention. The soft starter unit 6 only has to provide a current and a voltage value, which typically is present anyway in the soft starter unit 6. Furthermore, the soft starter unit 6 also has to respond to an external request for a voltage change. Also such functions are easily obtained by conventional soft starters. This means that in order to apply the present invention on existing equipment, only one additional unit is requested, and not a completely new soft starter unit.

Figures 6, 10:
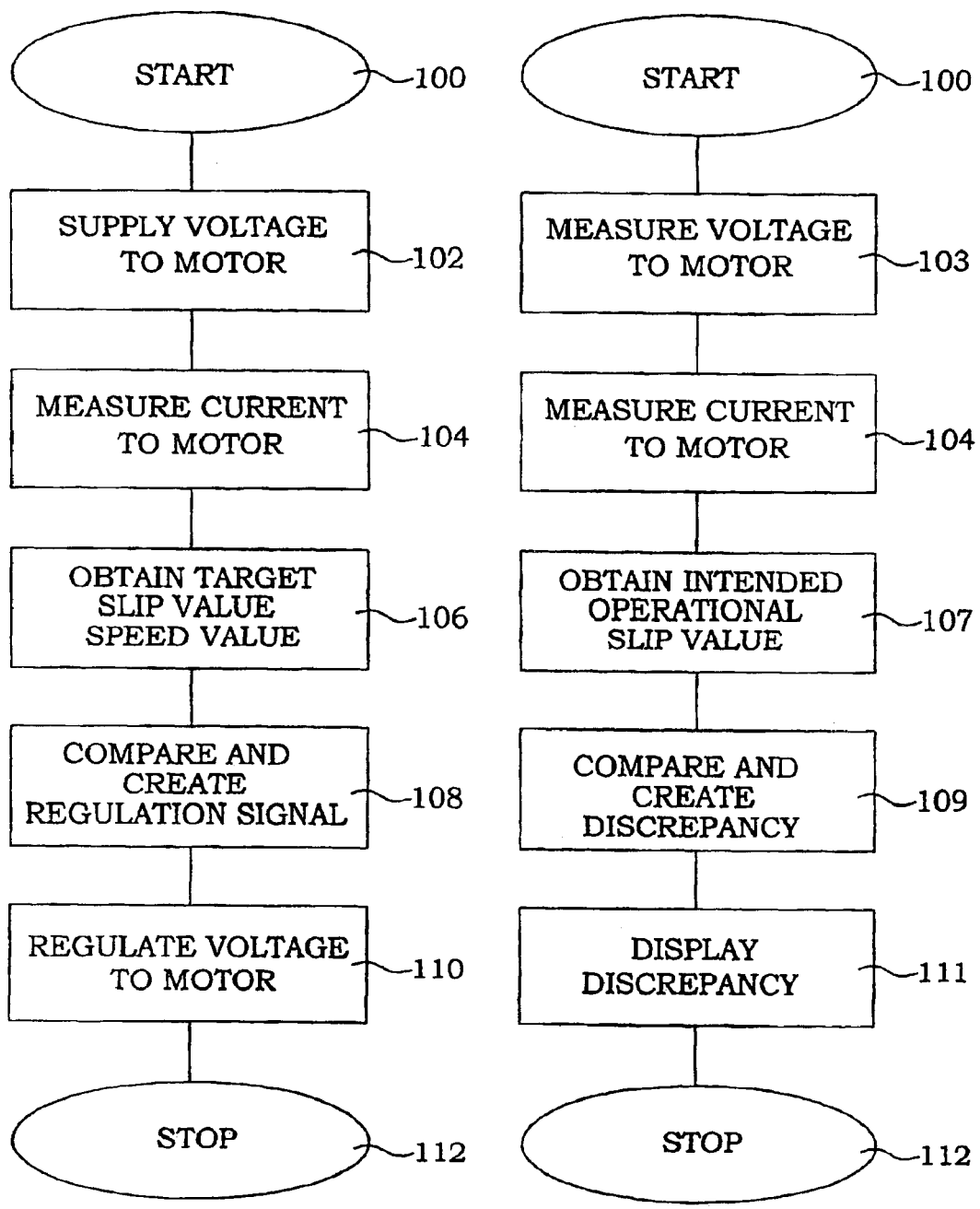
FIG. 6 is a flow diagram of a control method according to the present invention.
FIG. 10 is a flow diagram of a monitoring method according to the present invention.

FIG. 6 shows a flow diagram, which represents the basic steps in a regulation method according to the present invention. The procedure starts in step 100. In step 102, a voltage is supplied to a rotary motor. The actual current to the motor is measured in step 104, e.g. as a RMS value or peak value. A target slip value is obtained in step 106, and in step 108, the target value is compared with the measured current value. This is performed either by converting the measured current into an actual slip value or by converting the target slip into a target current value. The difference regulates a difference voltage signal. Based on this difference voltage signal, the voltage supplied to the motor is regulated in step 110. The procedure stops in step 112.

FIG. 10 shows a flow diagram, which represents the basic steps in a monitoring method according to the present invention. The procedure starts in step 100. In step 103, a voltage supplied to a rotary motor is measured. The actual current to the motor is measured in step 104, e.g. as a RMS value or peak value. An intended operational slip value is obtained in step 107, and in step 109, the intended operational value is compared with the measured current value. This is performed either by converting the measured current into an actual slip value or by converting the target slip into a target current value. The discrepancy is presented in step 111. The procedure stops in step 112.

Figure 1A:
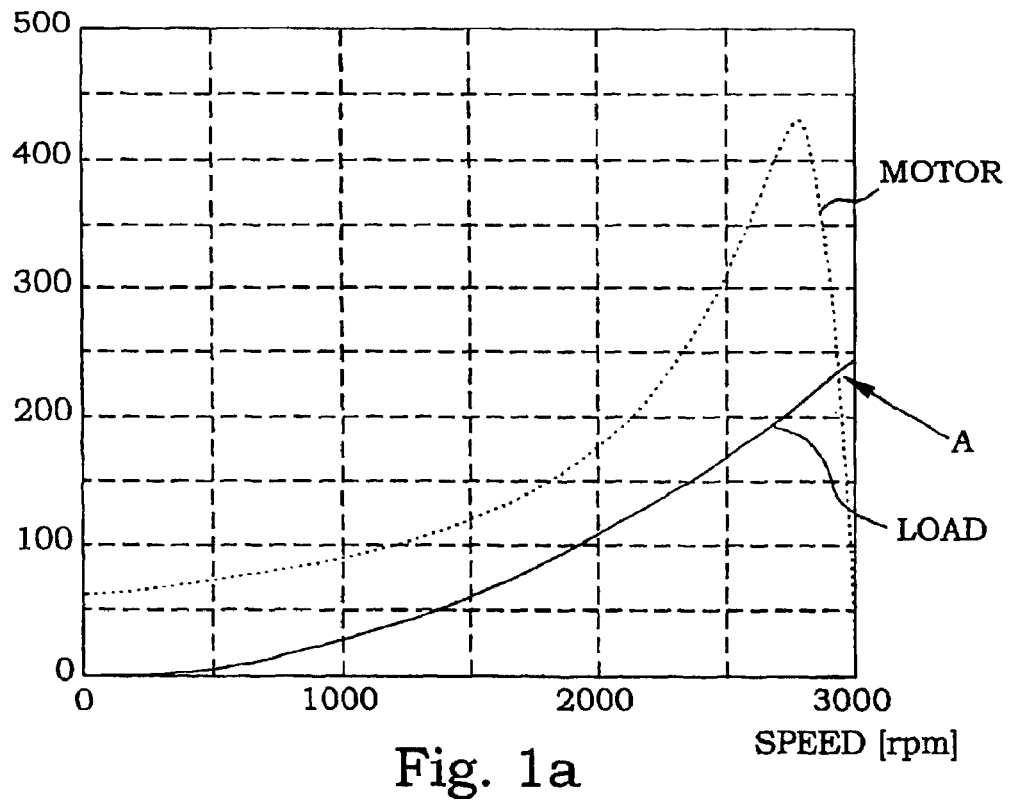
FIG. 1a is a diagram illustrating torque curves for normal operation of a typical asynchronous motor and a pump load connected to the motor.
Figure 1B:
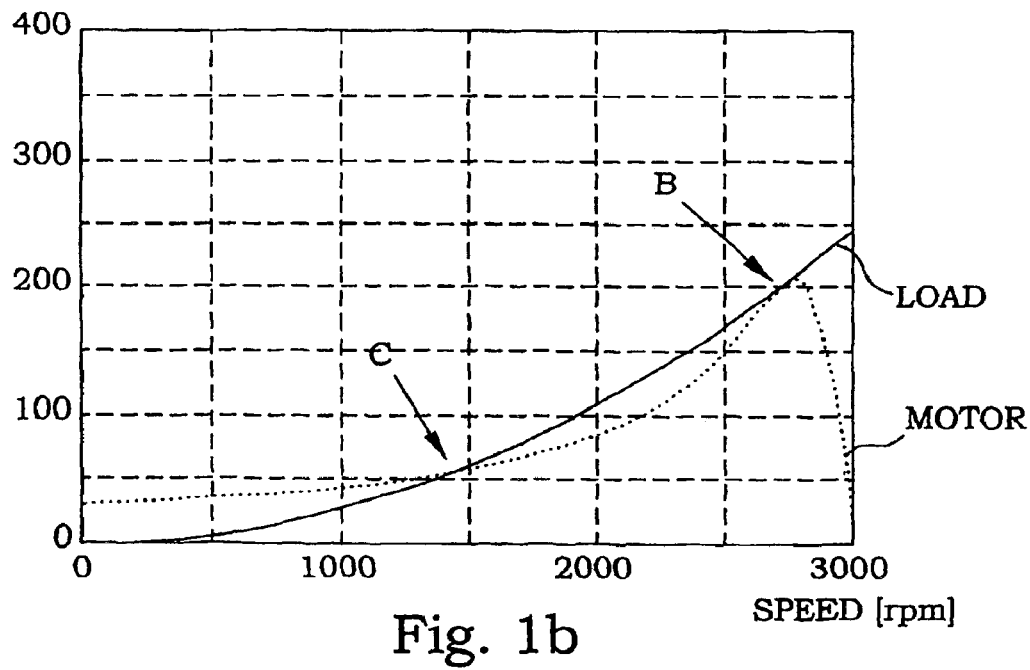

FIG. 7 is a typical illustration of how the control method and device according to the invention operates. FIG. 7 is a diagram showing the target slip and the voltage applied to the motor as functions of time, during a stopping procedure. The motor is assumed to be driving a pump unit, having a small inertia. In a conventional stopping procedure, a sudden torque change may occur during stopping. With the devices and method according to the present invention, another course of events will be the result. The target slip is originally set to a value corresponding to the speed for continuous operation, in this example corresponding to just below 3000 rpm. This value is typically 1–3%. When the stopping is requested, a linear ramping-up of the target slip takes place, illustrated by the full curve. (Note that the scale of the slip is turned upside down.) When the target slip is increased, the regulation according to the present invention starts. The voltage will initially drop quite rapidly. When the voltage is reduced so much that the maximum point of the torque curve (c.f. FIG. 1b) becomes the operational point, the voltage drop is slowed down. When the operational point reaches the unstable situation of FIG. 1b, the voltage is increased again in order to prevent any sudden speed changes. Eventually, the voltage is decreased once more down to zero, when the critical passage is passed. A typical voltage curve is illustrated in broken lines in FIG. 7.

Figure 2:
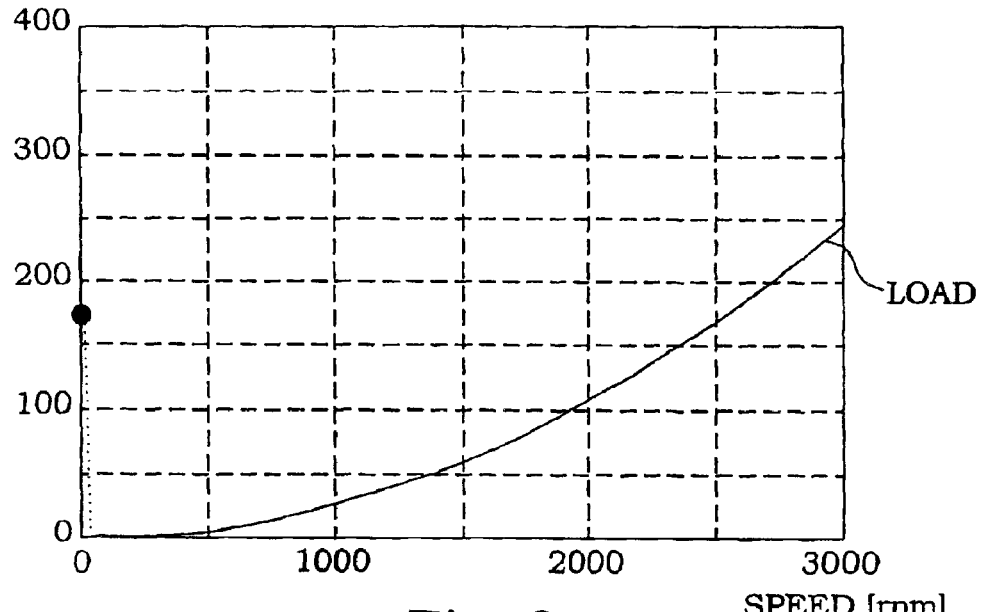
FIG. 2 is a diagram illustrating a possible torque curve for a stirring device.

FIG. 8 is instead a diagram showing the target slip and the voltage applied to the motor as a function of time, during a starting procedure. The motor is in this case assumed to drive a stirrer, having a load curve similar to the one illustrated in FIG. 2. In order to overcome the initial load, a rather high voltage has to be applied. During this time, the target slip is increased, while the actual slip still remains at zero. When the stirrer starts to move, the load decreases considerably due to the difference between the load at static and dynamic conditions, and in order to keep the intended linear increase of slip, the voltage will be strongly reduced. The actual slip rapidly becomes equal to the target slip. This gives rise to the voltage "spike" in the broken voltage curve of the diagram. The voltage will then slowly be increased according to a "normal" start. The starting voltage curve will then basically have a similar behaviour as the stopping curve, but in the opposite order.

The methods according to the present invention may be implemented as software, hardware, or a combination thereof. A computer program product implementing the method or a part thereof comprises a software or a computer program run on a general purpose or specially adapted computer, processor or microprocessor. The software includes computer program code elements or software code portions that make the computer perform the method using at least one of the steps previously described in FIG. 6 or FIG. 10. The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server. Such a computer program product can also be supplied via a network, such as Internet.

It is thus obvious that a devices and methods according to the present invention in a cheap but reliable manner will improve the start and stop behaviour of rotary electrical machines.

It will be understood by those skilled in the art that various modifications and changes may be made to the present invention without departure from the scope thereof, which is defined by the appended claims.

What is claimed is:

1. A method for rotational speed control of a rotary electrical motor, the method comprising:
   supplying a voltage to said rotary electrical motor;
   measuring the current to said rotary electrical motor;
   combining said measured current value and said voltage with a target slip, making use of a predetermined relation between current, voltage and slip, giving a regulation signal;
   varying said target slip according to a predetermined time schedule; and
   adding a voltage to said rotary electrical motor, according to said regulation signal.

2. The method for rotational speed control according to claim 1, wherein said combining comprises:
   converting said target slip into a target current value, using said relation;
   comparing said measured current value and said target current value, giving a discrepancy value as the difference; and
   obtaining said regulation signal by regulating on the discrepancy value.

3. The method for rotational speed control according to claim 1, wherein said combining comprises:
   converting said measured current into an actual slip value, using said relation;
   comparing said actual slip value and said target slip value, giving a discrepancy value as the difference; and
   obtaining said regulation signal by regulating on the discrepancy value.

4. The method for rotational speed control according to claim 1, wherein said combining is performed in different phases of the operation of the motor.

5. The method for rotational speed control according to claim 1, wherein said relation is an actually measured relation between slip, voltage and current for said rotary electrical motor.

6. The method for rotational speed control according to claim 1, wherein said relation is a predetermined modelled relation between slip, voltage and current for said rotary electrical motor.

7. A speed control device for a rotary electrical motor, comprising:
   a voltage supply, connected to said rotary electrical motor;
   measuring means for measuring a current supplied to said rotary electrical motor;
   comparing means, connected to said measuring means and said voltage supply, for combining said measured current value and said voltage with a target slip, said comparing means utilizing a relationship between current, voltage and slip, giving a regulation signal, said comparing means comprising means for storing a model of said relationship between slip, voltage and current for said rotary electrical motor;
   whereby said voltage supply is arranged to add a voltage to said rotary electrical motor, according to said regulation signal.

8. The speed control device according to claim 7, wherein said comparing means comprises:
   converting means for converting said target slip value into a target current value, using said relationship;
   a comparator for comparing said measured current value and said target current value, giving a discrepancy value as the difference; and
   regulation means for obtaining said regulation signal by regulating on the discrepancy value.

9. The speed control device according to claim 7, wherein said comparing means comprises:
   a converter operative to convert said measured current into an actual slip value, using said relationship;
   a comparator operative to compare said actual slip value and said target slip value, giving a discrepancy value as the difference; and
   a regulator operative to obtain said regulation signal by regulating on the discrepancy value.

10. The speed control device according to claim 7, wherein said comparing means comprises:
    a first converting means comprising converting means for converting said target slip value into a target current value, using said relationship, a comparator for comparing said measured current value and said target current value, giving a discrepancy value as the difference, and regulation means for obtaining said regulation signal by regulating on the discrepancy value;
    a second converting means comprising a converter operative to convert said measured current into an actual slip value, using said relationship, a comparator operative to compare said actual slip value and said target slip value, giving a discrepancy value as the difference, and a regulator operative to obtain said regulation signal by regulating on the discrepancy value; and
    selecting means for selecting one of said first converting means and second converting means in different phases of the operation of the motor.

11. The speed control device according to claim 7, further comprising:
    means for varying said target slip according to a predetermined time schedule.

12. The speed control device according to claim 7, wherein said comparing means further comprises means for storing an actually measured relation between slip, voltage and current for said rotary electrical motor.

13. Use of a speed control device according to claim 7, for start and/or stop of a rotary electrical motor.

14. A regulator unit for a soft starter/stopper device of an asynchronous rotary electrical motor, the regulator unit comprising:
    receiving means for receiving a value of a current and voltage supplied to said rotary electrical motor;
    comparing means connected to said receiving means and being operative to combine said measured current value and said voltage with a target slip, and to utilize a predetermined relationship between current, voltage and slip, giving a regulation signal, said comparing means further comprising means for storing a predetermined model of said relationship between slip, voltage and current for said asynchronous rotary electrical motor; and means for providing said regulation signal to said rotary electrical motor.

15. The regulator unit according to claim 14, wherein said comparing means further comprises:
converting means for converting said target slip value into a target current value, using said relationship;
a comparator operative to compare said measured current value and said target current value, giving a discrepancy value as the difference; and
regulation means for obtaining said regulation signal by regulating on the discrepancy value.

16. The regulator unit according to claim 14, wherein said comparing means comprises:
converting means for converting said measured current into an actual slip value, using said relationship;
a comparator operative to compare said actual slip value and said target slip value, giving a discrepancy value as the difference; and
a regulator operative to obtain said regulation signal by regulating on the discrepancy value.

17. The regulator unit according to claim 14, wherein said comparing means comprises:
a first converter;
a second converter; and
means for selecting one of said first converter and second converter in different situations.

18. The regulator unit according to claim 14, further comprising:
means for varying said target slip according to a predetermined time schedule.

19. The regulator unit according to claim 14, wherein said comparing means further comprises means for storing an actually measured relationship between slip, voltage and current for said asynchronous rotary electrical motor.

20. A rotary electrical motor system, comprising a rotary electrical motor and a speed control device, said speed control device comprising:
a voltage supply connected to said rotary electrical motor;
measuring means for measuring a current supplied to said rotary electrical motor; and
comparing means connected to said measuring means and said voltage supply, said comparing means combining said measured current value and said voltage with a target slip, making use of a predetermined relationship between current, voltage and slip, giving a regulation signal, said comparing means comprising storage means for storing a predetermined model of said relation between slip, voltage and current for said rotary electrical motor;
whereby said voltage supply is arranged to add a voltage to said rotary electrical motor, according to said regulation signal.

21. The rotary electrical motor system according to claim 20, wherein said comparing means comprises:
a converter operative to convert said target slip value into a target current value, using said relationship;
a comparator operative to compare said measured current value and said target current value, giving a discrepancy value as the difference; and
a regulator operative to obtain said regulation signal by regulating on the discrepancy value.

22. The rotary electrical motor system according to claim 20, wherein said comparing means comprises:
a converter operative to convert said measured current into an actual slip value, using said relationship;
a comparator operative to compare said actual slip value and said target slip value, giving a discrepancy value as the difference; and
a regulator operative to obtain said regulation signal by regulating on the discrepancy value.

23. The rotary electrical motor system according to claim 20, wherein said comparing means comprises:
a first converter;
a second converter; and
selecting means for selecting one of said first converter and second converter in different phases of the operation of the motor.

24. The rotary electrical motor system according to claim 20, further comprising:
means for varying said target slip according to a predetermined time schedule.

25. The rotary electrical motor system according to claim 20, wherein said comparing means further comprises:
storage means for storing an actually measured relation between slip, voltage and current for said rotary electrical motor.

26. The rotary electrical motor system according to claim 20, wherein said comparing means further comprises:
means for storing a predetermined model of said relation between slip, voltage and current for said rotary electrical motor.

27. Use of a rotary electrical motor system according to claim 20, for start and/or stop of a rotary electrical motor in said rotary electrical motor system.

28. A method for monitoring operational conditions for a rotary electrical motor, the method comprising:
measuring a voltage supplied to said rotary electrical motor;
measuring the current to said rotary electrical motor;
combining said measured current value and said voltage with an intended operational slip, utilizing a predetermined relationship between current, voltage and slip, giving a discrepancy value associated with any present deviation from intended operational conditions; and
presenting said discrepancy value.

29. The method for monitoring operational conditions according to claim 28, wherein said combining step comprises:
converting said intended operational slip into an intended operational current value utilizing said relationship; and
comparing said measured current value and said target current value, giving a discrepancy value as the difference.

30. The method for monitoring operational conditions according to claim 28, wherein said combining step comprises:
converting said measured current into an actual slip value, using said relation; and
comparing said actual slip value and said intended operational slip value, giving a discrepancy value as the difference.

31. A computer program product for performing rotational speed control of a rotary electric motor, comprising:
a computer readable medium; and
computer program instructions, recorded on the computer readable medium, executable by a processor, for performing the steps of:

supplying a voltage to said rotary electrical motor;

measuring the current to said rotary electrical motor;

combining said measured current value and said voltage with a target slip, making use of a predetermined relation between current, voltage and slip, giving a regulation signal;

varying said target slip according to a predetermined time schedule; and adding a voltage to said rotary electrical motor, according to said regulation signal.

32. The computer program product according to claim 31, wherein the computer program product is supplied via a network.

33. The computer program product according to claim 32, wherein the network is the Internet.

* * * * *